United States Patent
Sari (10) Patent No.: US 7,599,338 B2
(45) Date of Patent: Oct. 6, 2009

(54) PEAK POWER REDUCTION METHOD FOR WIRELESS COMMUNICATION SYSTEMS AND CORRESPONDING TRANSMITTER

(75) Inventor: Hikmet Sari, Charenton (FR)

(73) Assignee: Sequans Communication, Paris - La Defense Cedex (FR)

( * ) Notice: Subject to any disclaimer, the term of this patent is extended or adjusted under 35 U.S.C. 154(b) by 355 days.

(21) Appl. No.: 11/399,305

(22) Filed: Apr. 6, 2006

(65) Prior Publication Data

US 2006/0268672 A1    Nov. 30, 2006

(30) Foreign Application Priority Data

Apr. 14, 2005    (EP) ................... 05290823

(51) Int. Cl.
*H04B 7/216* (2006.01)
(52) U.S. Cl. .............. 370/335; 370/320; 370/342; 455/69; 455/522
(58) Field of Classification Search ............. 370/335, 370/320, 342; 455/69, 522
See application file for complete search history.

(56) References Cited

U.S. PATENT DOCUMENTS

| | | | | |
|---|---|---|---|---|
| 7,139,964 | B2 * | 11/2006 | Shen et al. | 714/758 |
| 7,151,804 | B2 * | 12/2006 | Tong et al. | 375/260 |
| 2004/0042559 | A1 | 3/2004 | Jaenecke et al. | |
| 2004/0258177 | A1 * | 12/2004 | Shen et al. | 375/308 |

OTHER PUBLICATIONS

European Search Report for co-pending European Application No. EP 05290823: 1 page.

Krongold et al. "Par reduction in OFDM via active constellation extension," IEEE transactions on Broadcating, IEEE, 2003, pp. 258-268.

Jones, "Peak power reduction in OFDM and DMT via active channel modification," Signals, Systems and Computers, 1999, Conference Record of the Thirty-Third ASILOMAR Conference, 1999, vol. 2, pp. 1076-1079.

Saul, "Comparison Between Recursive Clipping and Active Constellation Extension For Peak Reduction In OFDM Systems," International Symposium on Wireless Personal Multimedia Communications, 2003, pp. 37-39.

Tellambura "Phase opitimisation criterion for reducing peak-to-average power ration in OFDM," Electronic Letters, 1998, vol. 34, pp. 169-170.

Breiling et al. "SLM Peak-Power Reduction Without Explicit Side Information," IEEE Communications Letters, 2001, vol. 5 pp. 239-241.

Muller et al., "OFDM with reduced peak-to-average power ratio by optimum combination of partial transmit sequences," Electronic Letters, 1997, vol. 33, pp. 368-369.

Paterson, "Generalized Reed-Muller Codes and Power Control in OFDM Modulation," IEEE Transactions on Information Theory, 2000, vol. 46, pp. 104 1998, pp. 104-120.

* cited by examiner

*Primary Examiner*—Nghi H Ly
(74) *Attorney, Agent, or Firm*—Meyertons, Hood, Kivlin, Kowert & Goetzel, P.C.; Eric B. Meyertons (57) ABSTRACT

A peak power reduction method for wireless communication systems is proposed in which a constellation shaping is applied on input data symbols in order to reduce the peak power of the signal samples to be transmitted by the communication system. According to the invention, the symbols are modified using functions each representing the contribution of a symbol to the output signal samples of large magnitude.

11 Claims, 6 Drawing Sheets

PEAK POWER REDUCTION METHOD FOR WIRELESS COMMUNICATION SYSTEMS AND CORRESPONDING TRANSMITTER

BACKGROUND OF THE INVENTION

1. Field of the Invention

The present invention relates to wireless communication systems and, in particular, to a wireless communication system using multicarrier transmission technique such as Orthogonal Frequency-Division Multiplexing (OFDM) or Code Division Multiplexing (CDM).

More particularly, the invention relates to a wireless communication system and method in which the problem of reducing the Peak to Average Power Ratio (PAPR) can be overcome.

2. Description of the Relevant Art

The multicarrier transmission technique known as orthogonal frequency-division multiplexing (OFDM) has been adopted in many recent wireless communications standards. For example, the IEEE 802.11a specifications for WiFi are based on 64-carrier OFDM and the most popular mode of IEEE 802.16 specifications is based on 256-carrier OFDM. This technology also appears today as one of the strongest candidates for cellular communications after the third-generation cellular communication systems.

One of the major problems of the OFDM signal format is the large peak-to-average power ratio (PAPR). Indeed, even with simple signal constellations like the quaternary phase-shift keying (QPSK) constellation used in many systems, OFDM leads to high peak power values, because the transmitted signal is the sum of a large number of uncorrelated signals and its amplitude distribution looks like Gaussian. The consequence of this is that the power amplifier at the transmitter must be substantially backed off from its saturation point so as to operate in its linear region in order not to distort the OFDM signal. Therefore, power amplifiers with a large linear range are required for OFDM systems, but such amplifiers are major cost components of the OFDM systems. Besides, if the amplifier back off is not sufficient, its nonlinear characteristics will degrade the bit error rate (BER) performance, on one hand, and affect the spectrum shaping of the transmitted signal, on the other hand. As a result of the second effect, the transmitted signal spectrum may lose its compliance with the applicable spectral mask.

The same problem also arises in code-division multiplexing (CDM), code-division multiple access (CDMA), and in other transform-based digital signal formats. In a cellular system based on CDMA, for example, the signal transmitted by the base station (BS) is a sum of signals spread using different spreading codes or sequences, and its PAPR is similar to that of OFDM. On the uplink too, namely from users to the base station, the transmitted signal is often a sum of spread signals, because a multitude of spreading codes are assigned to users requesting a high data rate on the uplink. For this reason, the high PAPR problem is also encountered on both the uplink and the downlink of CDMA-based systems. This is the case in the third-generation cellular standards including the Universal Mobile Telecommunications Standard (UMTS) adopted in Europe.

Figure 1:
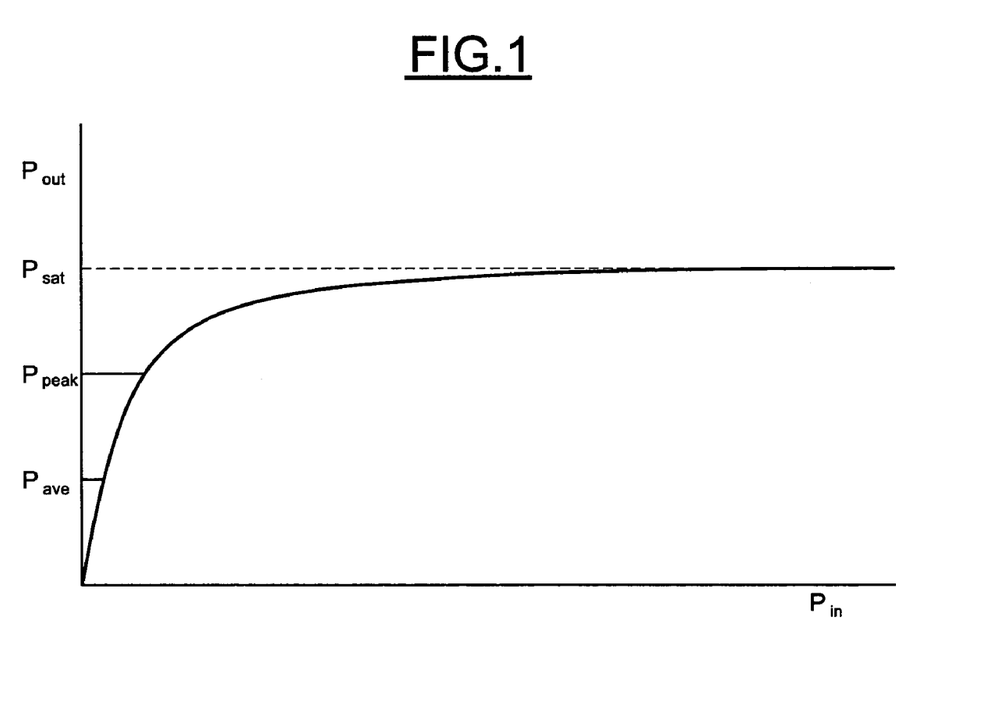
FIG. 1, shows the operating region of a power amplifier of a transmitter.

Reference will now be made to FIG. 1 which schematically shows the variation of the output power $P_{out}$ of a power amplifier of transmitter as a function of the input power $P_{in}$, illustrating the operating regions of the amplifier. As previously indicated, the most common approach to handle power amplifier nonlinearities is to sufficiently back off the power amplifier from its saturation point such that the amplifier operates in its linear region. However this solution is very costly as it requires the use of transmit amplifiers with a very high saturation power and therefore a large linear range. If the peak power $P_{peak}$ of the transmitted signal is in the linear region of the amplifier and its peak-to-average power ratio (PAPR) is large, then the average transmitted signal power $P_{ave}$, will be very far from the saturation power $P_{sat}$, and obviously the amplifier will be used in a very inefficient way.

Another solution consists in clipping the input signal to the power amplifier so that the clipped signal amplitude essentially lies in the amplifier's linear region. This technique makes the signal insensitive to the amplifier nonlinearity, but in this case, the clipping operation itself leads to signal distortion and some spectral widening.

Other well-known techniques to handle nonlinear distortion are predistortion at the transmitter and nonlinear channel equalization at the receiver. Since channel equalization is placed at the receiver, it does not change the shape of the transmitted signal and does not help with respect to spectrum widening. As for predistortion techniques, they need to be adaptive to track the amplifier response changes and this involves a substantial complexity.

The foregoing techniques are applicable to all digital signal formats. There are also some techniques that are specific to OFDM communication systems. These aim at reducing the peak power or the PAPR of OFDM signals. Peak power reduction techniques in OFDM include coding, phase optimization and multiple signal representation.

Reference can be made to J. Tellado, Multicarrier Modulation with Low Peak to Average Power Applications to xDSL and Broadband Wireless, Boston/Dordrecht/London: Kluwer Academic Publishers, 2000.

As concerns coding technique, this technique consists essentially in excluding the code words with high PAPR. This technique is for example disclosed in K. Patterson, "Generalized Reed-Muller Codes and Power Control in OFDM Modulation," IEEE Transactions on Information Theory, vol. 46, pp. 104-120, January 2000.

As an alternative, PAPR reduction can be achieved using a phase optimization, as disclosed in C. Tellambura, "Phase Optimization Criterion for Reducing Peak-to-Average Power Ratio in OFDM," Electronics Letters, vol. 34, pp. 169-170, January 1998 or using schemes relying on multiple signal representation, namely Selective Maping (SLM) and Partial Transmit Sequences (PTS) algorithms as disclosed in M. Breiling, S. H. Muller, and J. B. Huber, "SLM Peak-Power Reduction without Explicit Side Information," IEEE Communications Letters, vol. 5, pp. 239-241, June 2001; and in S. H. Muller and J. B. Huber, "OFDM with Reduced Peak-to-Average Power Ratio by Optimum Combination of Partial Transmit Sequences," Electronics Letters, vol. 33, pp. 368-369, February 1997.

As concerns Partial Transmit Sequences, each block of a subcarrier is multiplied by constant phase factors, and these phase factors are optimized to minimize the PAPR. In selective maping, multiple sequences are generated from the same information, and a sequence with the lowest PAPR is transmitted by the transmitter.

However, the main problem of these techniques is that they require a transmission of side information to the receiver such that the receiver receives information concerning the treatment carried out by the transmitter onto the transmitted data.

At last, more recent attempts reduce the peak power by using a constellation shaping in a signal constellation, namely by changing the signal constellation, introducing new constellations, or inserting pilot signals either in unused subcarriers or over some or all of the used carriers, as indicated in J.

Tellado, "Multicarrier Modulation with Low Peak to Average Power Applications to xDSL and Broadband Wireless", Boston/Dordrecht/London: Kluwer Academic Publishers, 2000.

These techniques, however, involve very complex optimization procedures.

SUMMARY OF THE INVENTION

In view of the foregoing, the invention aims at reducing the peak to average power ratio of transform-based signal formats such as OFDM and CDM signals in which the above mentioned drawbacks of the techniques according to the state of the art are overcome.

Accordingly, a first embodiment is directed to a peak power reduction method for wireless communication systems using transform-based signal formats such as OFDM and CDM communication systems, the method includes applying a constellation shaping for modifying the representation, in a signal constellation, of possible values of transmitted data symbols generating the signal samples to be transmitted by the communication system.

In this method, the symbols are modified using functions each representing the contribution of a symbol to the output signal samples of large magnitude.

In one embodiment, the method includes:
  for each data symbol, computing the function representing the contribution of said data symbol to the output signal samples of large magnitude to be transmitted by the communication system;
  identifying the functions corresponding to the strongest contribution;
  modifying the value of the symbols having the identified functions, and;
  updating the output signal samples on the basis of the modified values of the data symbols.

According to another feature, the values are modified by applying functions elaborated using the said identified functions having the strongest contribution, respectively.

In a particular embodiment, the values are modified using identical quantities.

The value of the symbols can be modified by modifying the amplitude of the symbols. However, the phase of the symbols can also be modified.

According to another feature, computing the said function representing the contribution of the data symbol, identifying the function corresponding to the strongest contribution, modifying the value of the symbols and updating the output signal samples are performed iteratively.

It should also be noted that the constellation shaping can be performed on a PSK signal constellation or on a QAM signal constellation.

A second embodiment is directed to a transmitter for wireless communication systems using transform-based signal formats such as OFDM and CDM communication systems, for carrying out a process as defined above, said transmitter including a first circuit for computing output signal samples corresponding to input data symbols, a second circuit including means for calculating, for each data symbol, a function representing the contribution of the symbol to the output signal samples of large magnitude, means for identifying the function to the strongest contribution, and means for modifying the representation of the data symbols in a signal constellation.

In different embodiments, the transmitter constitutes a transmitter for CDM or CDMA Communication System or a transmitter for OFDM or OFDMA Communication System.

BRIEF DESCRIPTION OF THE DRAWINGS

These and others attributes of the present invention will be described with respect to the following drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
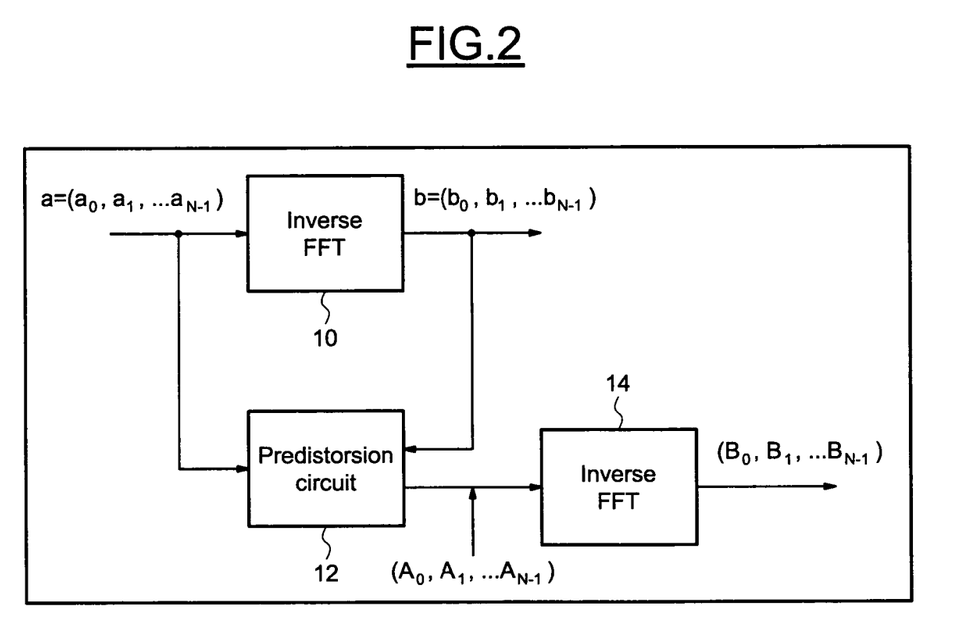
FIG. 2 illustrates a simplified block diagram of an OFDM or of an OFDMA transmitter.

Referring first to FIG. 2, a simplified block diagram of an OFDM or an OFDMA transmitter of a wireless communication system is disclosed.

This transmitter is intended to transmit signal samples ($B_0$, $B_1$, ... $B_{N-1}$) from a data elaborated from N data symbols ($a_0$, $a_1$, ..., $a_{N-1}$), while reducing the peak to the average power ratio of the transmitted signal.

This peak to average ratio reduction is obtained by applying a constellation shaping in order to modify the representation of possible values of the transmitted data symbols ($B_0$, $B_1$, ... $B_{N-1}$).

Figure 3:
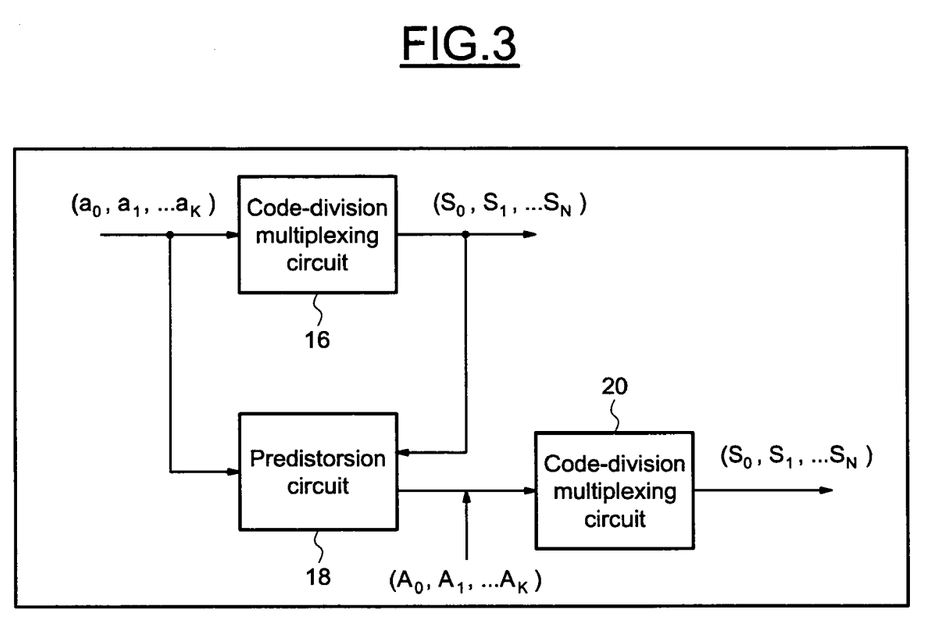

However, it should be noted that the invention also relates to a CDM or CDMA transmitter, as disclosed in FIG. 3 and, generally speaking, to any wireless communication system using transformed based signal formats.

Reducing the OFDM or CDM signal peak is based on predistorting or modifying the input symbols ($a_0, a_1 ..., a_{N-1}$). By predistoring, it is meant, within the present specification, modifying the representation of the data symbols to be transmitted in a signal constellation.

Figure 4:
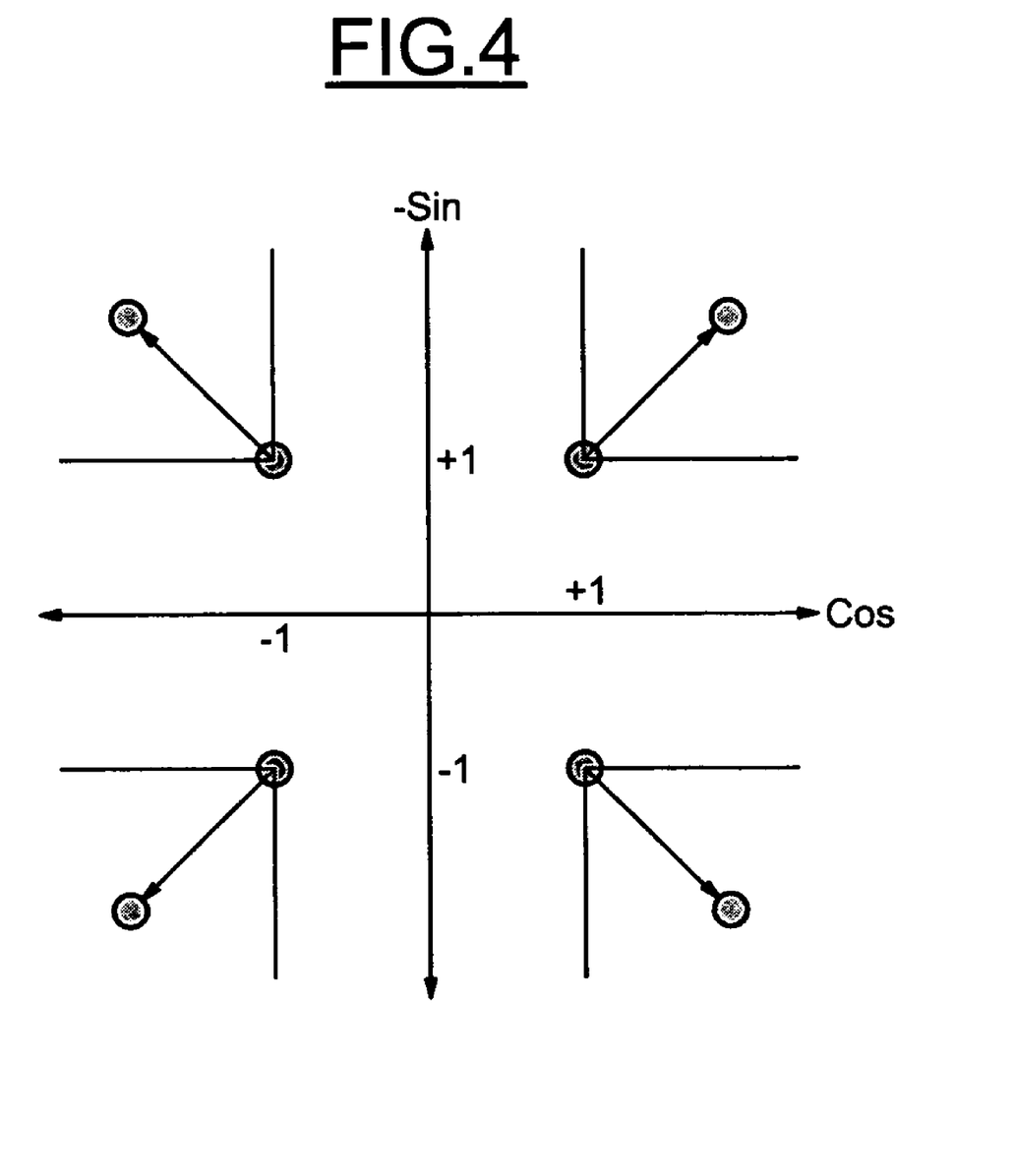
FIG. 4 shows the amplitude modification of transmitted data symbols in a QPSK signal constellation.

Reference is now made to FIG. 4 which shows a QPSK signal constellation. This figure shows the 4 constellation points and the regions in which those points can be placed without reducing minimum Euclidean distance and degrading BER performance. The inner points in this figure are the nominal points of the signal constellation. The outer points with arrows pointed to them are the predistorted signal points.

Figure 5:
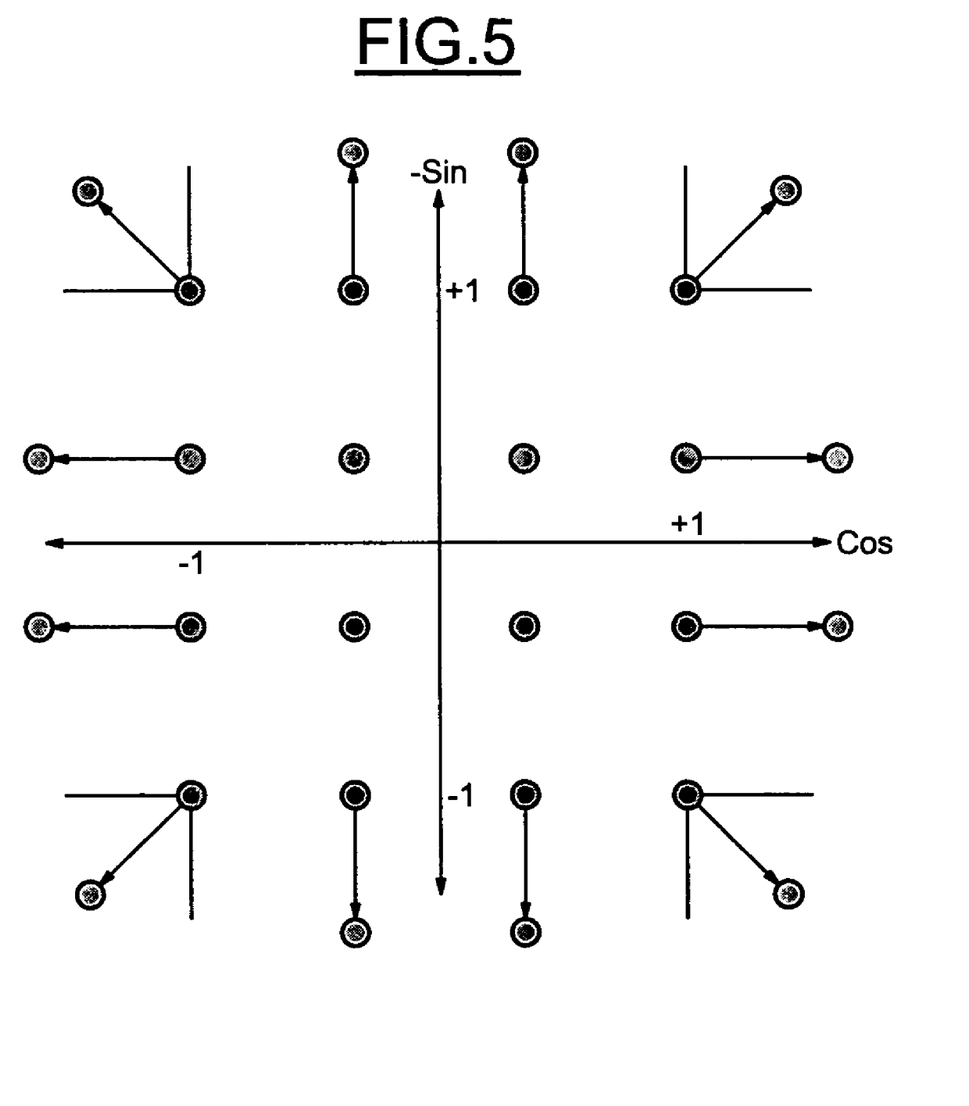
FIG. 5 shows the amplitude modification of transmitted data symbol in a 16-QAM signal constellation.
Figure 6:
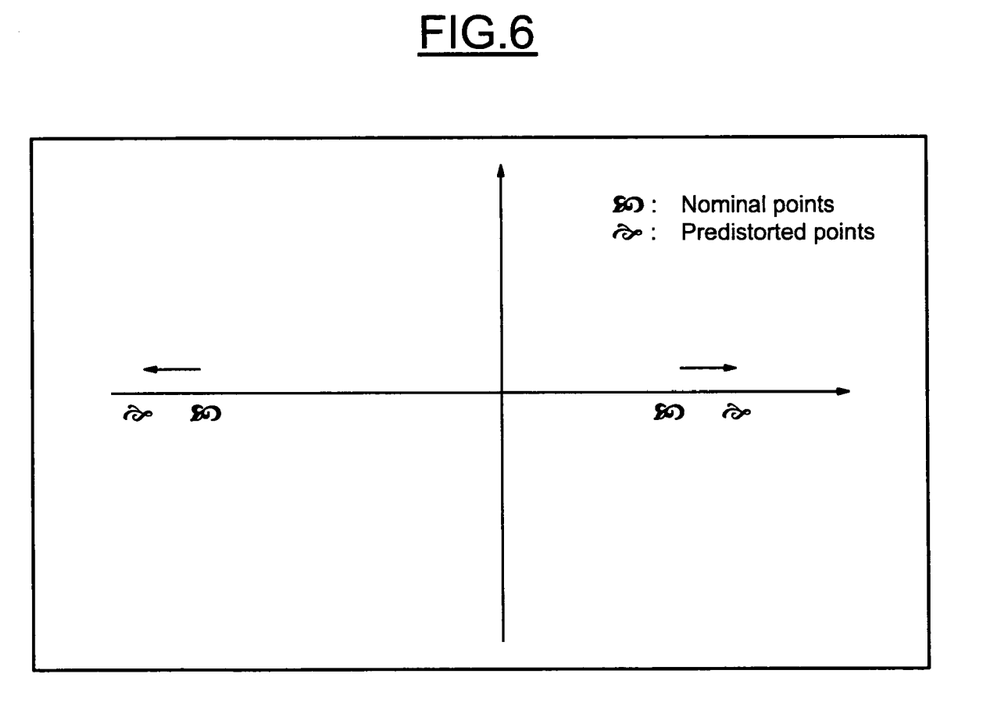
FIG. 6 shows the amplitude modification of values of transmitted data symbols in a BPSK signal constellation.

Similarly, FIG. 5 shows the 16-state quadrature amplitude modulation (16-QAM) constellation points and the regions in which they can be placed without reducing minimum distance and degrading performance. In this FIG. 5, the corner points of the constellation are predistorted in the diagonal direction, and side points are predistorted in the vertical or horizontal direction. It should be noted that the inner points of the signal constellation cannot be predistorted without degrading the BER, and therefore they are left unchanged.

In what follows, embodiment will be described for QPSK, but the principle is valid for other signal constellations, such as 16-QAM constellation.

The principle of one method will now be described:

Referring to FIG. 2, in OFDM transmission, the complex data symbol block $a=(a_0, a_1, \ldots, a_{N-1})$ to be transmitted is passed through a first circuit 10 including a N-point inverse fast Fourier transform circuit (IFFT) to obtain the discrete time-domain samples to be transmitted. The IFFT output signal block can be written as $$b_n = \frac{1}{\sqrt{N}} \sum_{m=0}^{N-1} \exp(j2\pi nm/N), \quad n = 0, 1, \ldots, N-1. \quad (1)$$

In addition to the inverse fast Fourier transform circuit 10, the transmitter further includes a modifying circuit 12 which receives the data symbol block $(a_0, a_1, \ldots, a_{N-1})$ and the output of the first circuit 10 to deliver, as an output, modified symbols $(A_0, A_1, \ldots, A_{N-1})$.

A third circuit 14, including a N-point inverse fast Fourier transform circuit (IFFT) delivers output sample $(B_0, B_1, \ldots, B_{N-1})$ having a reduced peak to average power ratio.

The inverse FFT transform circuit 10 receives N data symbols $(a_0, a_1, \ldots, a_{N-1})$ in parallel and outputs an N-point sample b denoted $(b_0, b_1, \ldots, b_{N-1})$. The modifying circuit 12 receives both data blocks a and b, computes a function representing the contribution of each data symbol $a_m$ of symbol block a to the output signal block b, modifies a subset of those symbols which correspond to the largest computed function, and supplies to the second Inverse FFT transform circuit 14 a modified symbol block $(A_0, A_1, \ldots, A_{N-1})$.

This circuit 14 outputs a block $(B_0, B_1, \ldots, B_{N-1})$ corresponding to the modified symbol values. It is of course possible to use the same Inverse FFT circuit for both operations.

The contribution of symbol $a_m$ to output sample $b_n$ is $$c_{mn} = a_m \cdot \exp(j2\pi mn/N). \quad (2)$$

The cosine of the angle between $b_n$ and $c_{mn}$, denoted $\phi_{mn}$, is given by:

$$\cos(\varphi_{mn}) = \frac{\operatorname{Re}(b_n c_{mn}^*)}{|b_n| \cdot |a_m|} \quad (3)$$

The projection of $c_{mn}$ on $b_n$ is $$|b_n| \cdot \cos(\varphi_{mn}) = \frac{\operatorname{Re}(b_n c_{mn}^*)}{|a_m|} \quad (4)$$

According to one embodiment, the value of data symbols is predistorted based on the above-mentioned function, which indicates how much the peak values of the time-domain signal can be reduced by modifying or predistorting the symbol without reducing minimum distance and degrading performance. However, only the data symbols corresponding to the strongest contribution to the signal samples to be transmitted are modified by the constellation shaping.

In order to determine the contribution of the data symbol to the output signal samples of large magnitude, namely to the output signal samples whose magnitude are close to the peak output signal magnitude, the following functions $\mu_m$ can be used for each symbol $a_m$:

$$\mu_m = \sum_{n=0}^{N-1} w(n) f(n, m) \quad (5)$$

where $w(n)$ is a weighting function of output sample $b_n$, which reflects its magnitude, and $f(n,m)$ is a function which gives an appropriate measure of the contribution of symbol $a_m$ to the output sample $b_n$. A reasonable weighting function is $w(n)=|b_n|^p$ with a proper value of p. Using the definition and $f(n,m)=-\cos(\phi_{nm})$, the final function becomes:

$$\mu_m = \frac{-1}{N|a_m|} \sum_{n=0}^{N-1} |b_n|^{p-1} \operatorname{Re}(b_n c_{mn}^*). \quad (6)$$

The number of terms in the sum can be limited to K by selecting the K largest $b_n$ values at the IFFT block output. This function is not necessarily positive for all am symbols. Only the symbols with positive metrics can be distorted without degrading performance, and predistortion can be limited to a subset of those.

In view of the foregoing, the algorithm carrying out by the modifying circuit 12 is as follows:

for each input data symbol $a_m$ a function $\mu_m$ representing the contribution of the symbol $a_m$ to the output signal samples of large magnitude is calculated;

the L symbols with largest positive functions are modified using a function of the form:

$A_m=(1+\alpha\mu_m{}^q)a_m$, where $\alpha$ is a positive constant and q is a suitable real number;

finally, after transformation by the third circuit 14, the IFFT output is $$B_n = b_n + \frac{1}{\sqrt{N}} \sum_{m \in S_L} \alpha \mu_m^q a_m e^{j2\pi nm/N} \quad (7)$$

where $S_L$ is the set of integers corresponding to the indices of the L symbols with largest metrics.

The output $B_n$, $n=0, 1, \ldots, N-1$ is the IFFT output vector corresponding to the modified input symbols.

In this embodiment, a set of input symbols is amplitude predistorted or modified, each symbol being predistorted by a quantity that is determined by its associated function.

In a second embodiment, the symbols are modified using the function:

$A_m=(1+\alpha)a_m$.

In other words, all predistorted symbols are predistorted by the same quantity and this significantly simplifies the implementation.

In the above description, symbol modification is carried out using a one-shot method. According to another embodiment, this process is iterative and reiterated one or more times to further reduce peak signal power.

As indicated above, the invention applies also for CDM and CDMA signals.

Referring now to FIG. 3, a simplified block diagram of CDM or CDMA transmitter is disclosed.

The method for reducing the peak to average power ratio carried out by this transmitter is identical to that of the transmitter disclosed in FIG. 2 and includes modifying the representation of the values of the data symbols to be transmitted in order to reduce the PAPR.

As it can be seen in FIG. 3, the transmitter, in this embodiment, includes a code-division multiplexing circuit 16 which receives K data symbols $(a_1, a_2, \ldots, a_K)$ and which output an N-point block denoted $(s_1, s_2, \ldots, s_N)$. A modifying circuit 18 receives both blocks $(a_1, a_2, \ldots, a_K)$ and $(s_1, s_2, \ldots, s_N)$, computes a contribution function for all input symbols, modifies a subset of those symbols which correspond to the largest computed function, and supplies a second code-division multiplexing circuit 20 a modified block $(A_1, A_2, \ldots, A_K)$. This circuit outputs a block $(S_1, S_2, \ldots, S_N)$ corresponding to the modified symbol value. It is of course possible to use the same circuit for both operations.

Consider a set of K users transmitting binary phase-shift keying (BPSK) signals. Assume that $\{a_k, k=1, 2, \ldots, K\}$ denote the symbols transmitted by these users during a given symbol period. All of these symbols take their values from the set $\{\pm1\}$. Next, assume that K spreading sequences of length N, denoted $W_k$, $k=1, 2, \ldots, K$ are used to spread the spectrum of these user signals. The sum of the signals transmitted by the K users can be written as $$s_n = \sum_{k=1}^{K} w_{kn} a_k, \quad n = 1, 2, \ldots, N \tag{8}$$

where $w_{kn}$ is the nth chip of sequence $W_k$. In this scheme, the transmitted signal block is $(s_1, s_2, \ldots, s_N)$, and some of these samples may take very large values. As in OFDM systems, peak power may be very large and it is of significant interest to reduce it in order to use the transmit power amplifier efficiently.

From equation (8), it appears that the contribution of symbol $a_k$ to output sample $s_n$ is $w_{kn} a_k$. If $w_{kn} a_k$ and $s_n$ are of different signs, the symbol $a_k$ can be expanded to reduce the magnitude of $s_n$. As in OFDM systems, a function can be defined that indicates how much the output signal magnitudes can be reduced by modifying a given symbol. A convenient function is as follows:

$$\mu_k = -\frac{1}{N} \sum_{n=1}^{N} \text{sign}(w_{kn} a_k) \text{sign}(s_n) |s_n|^{2p} \tag{9}$$

where p is an integer.

As described for OFDM, a set of L symbols here can be modified to reduce the peak power of the output signal. These symbols are those corresponding to the largest contribution function. Symbol modification can be made by transmitting $A_k=(1+\alpha)a_k$ or $A_k=(1+a\mu_k^q)a_k$, where q is a suitable real number.

Also, as previously indicated, the process can be reiterated if necessary.

The predistortion techniques described in this document are entirely transparent in the sense that this operation has no impact on the receiver. Therefore, they can be readily implemented in all of the existing OFDM, OFDMA, CDM and CDMA standards.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. Peak power reduction method for wireless communication systems using transform based signal formats such as OFDM and CDM communication systems,
   comprising:
   applying a constellation shaping for modifying the representation, in a signal constellation, of possible values of transmitted data symbols generating the signal samples to be transmitted by the communication system,
   wherein the symbols are modified using functions each representing the contribution of a symbol to the output signal samples of large magnitude.

2. Method according to claim 1, further comprising:
   for each data symbol, computing the function representing the contribution of said data symbol to the output signal samples of large magnitude to be transmitted by the communication system;
   identifying the functions corresponding to the strongest contribution;
   modifying the value of the symbols having the identified functions, and;
   updating the signal samples to be transmitted by the communication system on the basis of the modified values of the data symbols.

3. Method according to claim 1, wherein the values are modified by applying functions elaborated using the said identified functions having the strongest contribution, respectively.

4. Method according to claim 1, wherein all the values that are modified are modified using identical quantities.

5. Method according to claim 1, wherein the value of the symbols is modified by modifying the amplitude of the symbols.

6. Method according to claim 1, wherein the value of the symbols is modified by modifying the phase of the symbols.

7. Method according to claim 2, wherein computing the said function representing the contribution of the data symbol, identifying the function corresponding to the strongest contribution, modifying the value of the symbols and updating the output signal samples are performed iteratively.

8. Method according to claim 1, wherein the constellation shaping is performed on a Phase-Shift Keying (PSK) signal constellation.

9. Method according to claim 1, wherein the constellation shaping is performed on a quadrature amplitude modulation signal constellation.

10. Transmitter for wireless communication system using transform based signal formats such as OFDM and CDM communication systems, for carrying out a process according to claim 1, wherein the system comprises a first circuit for computing output signal samples corresponding to input data symbols, a second circuit comprising means for calculating, for each data symbol, a function representing the contribution of the symbol to the output samples of large magnitude, means for identifying the function corresponding to the strongest contribution and means for modifying the representation of the data symbols in a signal constellation.

11. Transmitter according to claim 10, wherein the transmitter is a transmitter for CDM or CDMA Communication System or a transmitter for OFDM or OFDMA Communication System.

\* \* \* \* \*

UNITED STATES PATENT AND TRADEMARK OFFICE
CERTIFICATE OF CORRECTION

PATENT NO. : 7,599,338 B2  Page 1 of 1
APPLICATION NO. : 11/399305
DATED : October 6, 2009
INVENTOR(S) : Hikmet Sari It is certified that error appears in the above-identified patent and that said Letters Patent is hereby corrected as shown below:

On the title page, item [30]:

In the Foreign Application Priority Data:

Please delete "05290823" and substitute therefor -- 05290823.3 --.

Signed and Sealed this

Twenty-fourth Day of November, 2009

David J. Kappos
*Director of the United States Patent and Trademark Office*